(12) United States Patent
Armenta Lopez et al.

(10) Patent No.: US 9,566,896 B2
(45) Date of Patent: Feb. 14, 2017

(54) VEHICLE CLUSTER WITH HIGH SPEED WARNING INDICATOR USING POSITION DATA

(71) Applicant: Continental Automotive Systems, Inc., Auburn Hills, MI (US)

(72) Inventors: Victor Raul Armenta Lopez, Tlajomulco de Zuniga (MX); Ricardo Melendez Paz, Guadalajara (MX); Ernesto Morales Guerrero, Zapopan (MX); Marco Antonio Vega Diaz, Zapopan (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 205 days.

(21) Appl. No.: 14/460,456

(22) Filed: Aug. 15, 2014

(65) Prior Publication Data

US 2016/0046229 A1    Feb. 18, 2016

(51) Int. Cl.
| | |
|---|---|
| *G08B 21/00* | (2006.01) |
| *B60Q 1/00* | (2006.01) |
| *B60K 37/02* | (2006.01) |
| *B60W 50/14* | (2012.01) |

(52) U.S. Cl.
CPC ............ *B60Q 1/00* (2013.01); *B60K 37/02* (2013.01); *B60K 2350/1064* (2013.01); *B60K 2350/206* (2013.01); *B60K 2350/2008* (2013.01); *B60K 2350/355* (2013.01); *B60W 2050/146* (2013.01); *B60W 2520/10* (2013.01); *B60W 2550/22* (2013.01)

(58) Field of Classification Search
CPC ........................................................ B60Q 1/00
USPC ................... 340/438, 441, 459–461, 905
See application file for complete search history.

(56) References Cited

U.S. PATENT DOCUMENTS

| | | | |
|---|---|---|---|
| 6,778,074 B1 | 8/2004 | Cuozzo | |
| 2007/0001830 A1 | 1/2007 | Dagci et al. | |
| 2007/0262883 A1* | 11/2007 | Kumabe | G08G 1/096716 340/936 |
| 2010/0315218 A1* | 12/2010 | Cades | B60K 35/00 340/441 |

FOREIGN PATENT DOCUMENTS

| | | |
|---|---|---|
| DE | 19901808 A1 | 7/2000 |
| DE | 102007004453 A1 | 7/2008 |

\* cited by examiner

*Primary Examiner* — Jeffery Hofsass

(57) ABSTRACT

An instrument cluster system for a vehicle includes a speedometer gauge having markings indicative of speeds of the vehicle, a pointer, and a speed warning indicator including adjacent lights arranged in position to correlate with the markings. A control unit receives inputs including a speed of the vehicle. GPS provides a location of the vehicle so that the control unit can obtain a posted speed limit of a road on which the vehicle is located. The control unit sends processed data to the cluster so that the cluster can control the lights based on the posted speed limit, such that lights correlating with speeds below the posted speed limit can be illuminated green and lights correlating with speeds above the posted speed limit can be illuminated red, thereby providing a visual warning to a driver as to whether the vehicle is operating above or below the posted speed limit.

17 Claims, 4 Drawing Sheets

VEHICLE CLUSTER WITH HIGH SPEED WARNING INDICATOR USING POSITION DATA

FIELD

The invention relates to a display cluster for a vehicle and, more particularly, to a system for low cost vehicles that obtains the posted speed limit of a road using global positioning system (GPS) and displays a warning to the driver that the vehicle is traveling above the posted speed limit.

BACKGROUND

In order to prevent traffic violations, certain deluxe vehicles have conventional systems that enable a driver to select a maximum speed and the vehicle will warn by an audio signal that the vehicle has exceeded the maximum speed. Also, a warn symbol may illuminate on vehicle's display cluster. For example, the user can select a maximum speed of 70 miles per hour and when the speed of the vehicle exceeds 70 miles per hour, the vehicle will issue an audible warning to warn the driver to reduce speed. This system is useful, but does not take into consideration the changing of posted speed limits. Thus, each time a posted speed limit changes, the user must enter a new maximum speed so as to receive an audible warning once the maximum speed is exceeded. Furthermore, entering the maximum speed may cause driver distraction and there are times when the driver does not know what maximum speed to enter, since the road sign indicating the posted speed limit may me missing.

There is a need in low-cost vehicles for a system that obtains the posted speed limit based on the location of the vehicle and visually warns a driver that the vehicle is exceeding the posted speed limit.

SUMMARY

An objective of the invention is to fulfill the need referred to above. In accordance with the principles of an embodiment, this objective is obtained by providing an instrument cluster system for a vehicle. The system includes an instrument cluster having a speedometer gauge including markings indicative of speeds of the vehicle, and a pointer movable relative to the markings. A speed warning indicator includes a plurality of adjacent lights, separated from the markings, and arranged in position to correlate substantially with the markings. A control unit is in communication with the instrument cluster and is constructed and arranged to receive and process inputs including a speed of the vehicle. A global positioning system is constructed and arranged to provide a location of the vehicle to the control unit so that the control unit can obtain a posted speed limit of a road on which the vehicle is located. The control unit is constructed and arranged to send processed data to the cluster so that the cluster can control the lights of the speed warning indicator to illuminate in at least two different colors based on the provided posted speed limit, such that lights correlating with speeds below the posted speed limit can be illuminated in a first color and lights correlating with speeds above the posted speed limit can be illuminated in a second color, thereby providing a visual warning to a driver as to whether the vehicle is operating above or below the posted speed limit.

In accordance with another aspect of an embodiment, a method provides visual indication to a driver of a vehicle as to a speed of the vehicle relative to a posted speed limit of a road on which the vehicle is located. Based on a position of the vehicle, the posted speed limit of a road on which the vehicle is located is obtained. An instrument cluster for the vehicle is provided to include a speedometer gauge having markings indicative of speeds of the vehicle, a pointer movable relative to the markings, and a speed warning indicator comprising a plurality of adjacent lights, separated from the markings, and arranged in position to correlate substantially with the markings. The lights of the speed warning indicator are controlled to illuminate in at least two different colors based on the obtained posted speed limit, such that lights correlating with speeds below the obtained posted speed limit are illuminated in a first color and lights correlating with speeds above the obtained posted speed limit are illuminated in a second color, thereby providing a visual warning to a driver as to whether the vehicle is operating above or below the obtained posted speed limit.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF EXEMPLARY EMBODIMENTS

Figure 1:
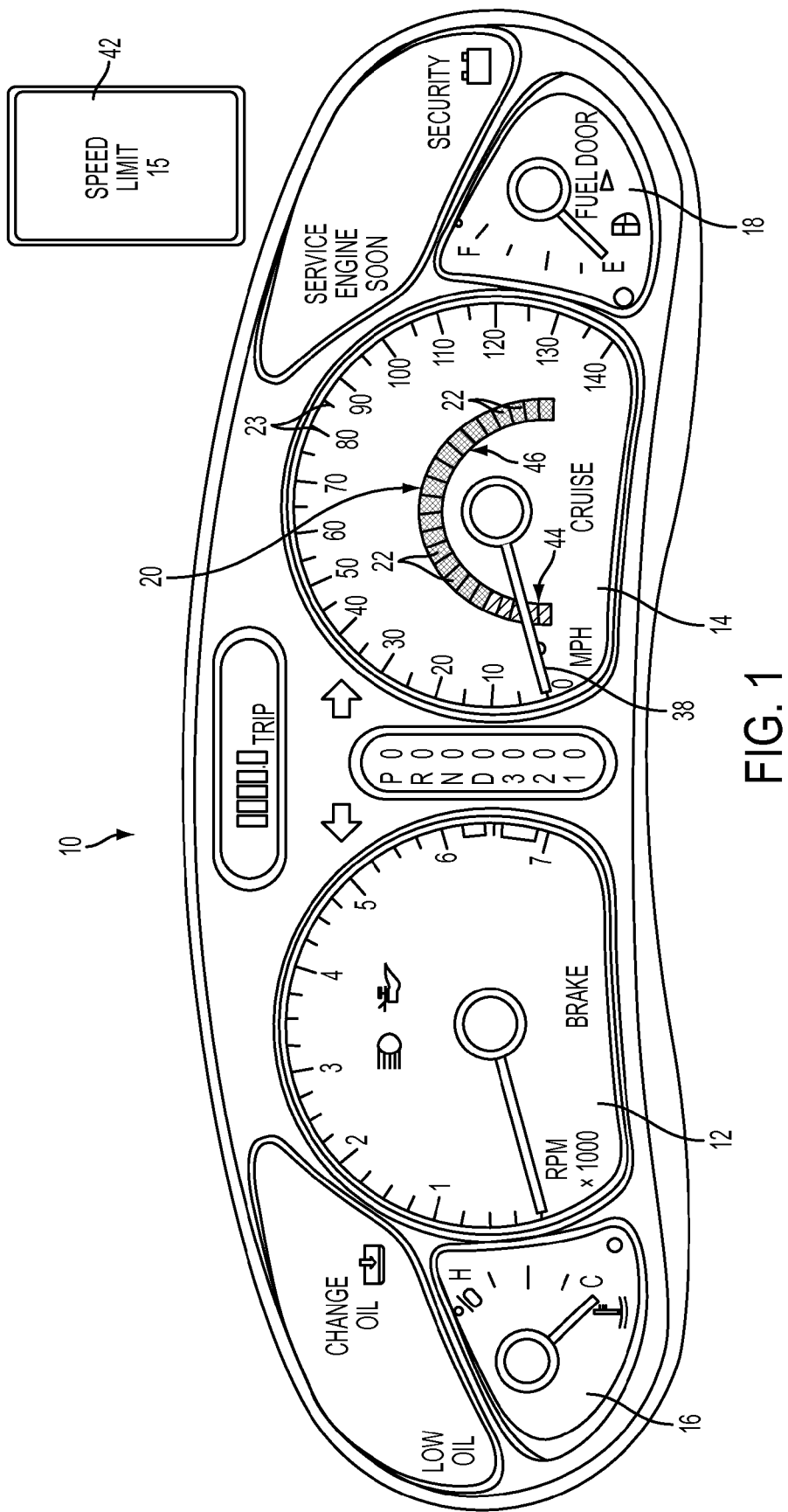
FIG. 1 is view of a vehicle electronic instrument cluster having a visual speed warning indicator in accordance with an embodiment, indicating that the vehicle is operating under the posted speed limit.

With reference to FIG. 1, a vehicle electronic instrument cluster is shown, generally indicated at 10, in accordance with an embodiment of the invention. The cluster 10 includes the conventional gauges or indicator such as, for example, a tachometer gauge 12, speedometer gauge 14, engine temperature indicator 16, fuel level indicator 18 and/or other conventional indicators or gauges.

In order to prevent traffic violations and help ensure safe driving of a vehicle, the cluster 10 includes a speed warning indicator, generally indicated at 20. In the embodiment, the warning indicator includes a plurality of adjacently oriented lights 22 preferably arranged in the speedometer gauge 14 of the cluster 10. The lights 22 are preferably light emitting diodes (LEDs) that provide various color indications. Since the speedometer gauge 14 is of preferably dial structure having speed markings 23 (such as speed numbers and/or indicator lines) arranged generally in an arced fashion, the lights 22 are preferably arranged in an arc-shape to substantially correlate positionally with the speed markings 23 shown on the speedometer gauge 14. In the embodiment, the speedometer gauge 14 shows speed markings between 0 and 140 mph. Thus, the position of the lights 22, arranged in the arc fashion and separate from the markings 23, substantially correlate with the 0 to 140 mph markings. In the embodiment, the warning indicator 20 comprises only lights 22 and does not include any numerical values or markings. It can be appreciated that shapes of the warning indicator 20, other than an arced, can be used so as to correlate positionally with the markings 23 of the speedometer gauge 14. For example, if the markings 23 of the speedometer gauge are arranged linearly, the lights 22 of the warning indicator 20 can also be arranged linearly.

Figure 4:
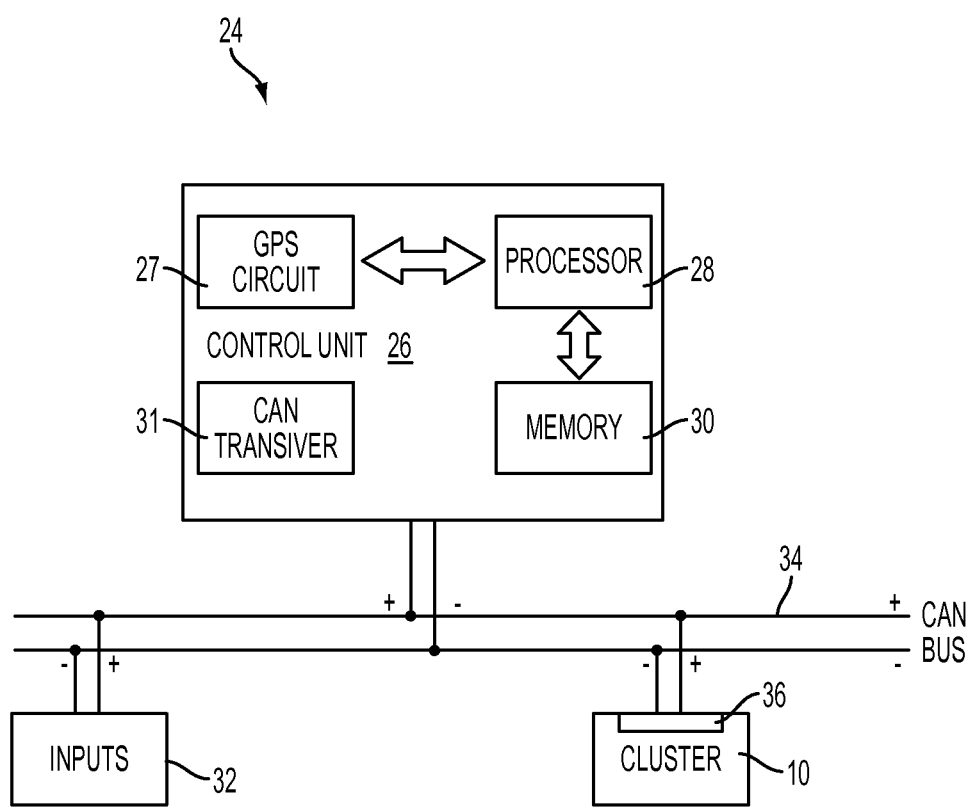
FIG. 4 is a schematic illustration of an instrument cluster system that includes the cluster of FIG. 1.

With reference to FIG. 4, an instrument cluster system is shown, generally indicated at 24, that includes the cluster 10. The system 24 includes a control unit 26 having a GPS circuit 27, a processor 28, memory 30 and a transceiver 31. Inputs 32 containing data such as vehicle speed, engine temperature, RPM, and fuel level are received, via a Controller Area Network (CAN) 34, by the control unit 26. The control unit 26 receives GPS signals (vehicle position) and processes the data in processor 28 which obtains the posted road speed limit information from memory 30 and, once the information is processed, the control unit 26 sends the information via CAN 34 to the cluster 10. The cluster 10 receives the data, processes the data in processor 36, and controls the speed warning indicator 20.

Based on the posted speed limit obtained from the control unit 26, the cluster 10 controls the lights 22 of the warning indicator 20 to illuminate in a certain fashion. For example, with reference to FIG. 1, if the posted speed limit is 15 mph (as obtained by the control unit 26), the lights 22 of the warning indicator 20 that correlate with speeds below the posted speed limit of 15 mph are illuminated in a first color (e.g., green), indicating a speed compliance zone, generally indicated at 44. The rest of the adjacent lights 22 will not be illuminated until pointer 38 reaches the maximum speed limit (15 mph). Once the pointer 38 is over the speed limit (15 mph), the adjacent lights 22 will illuminate in a second, different color (e.g., red), indicating a speed non-compliance zone, generally indicated at 46. As shown in FIG. 1, the speed warning indicator 20 is disposed in the speedometer gauge 14 and the pointer 38 is less than 15 mph. Thus, the driver can easily see that the pointer 38, indicating a vehicle speed of about 2 mph, is in the green, speed compliance zone 44 of the warning indicator 20.

Figure 2:
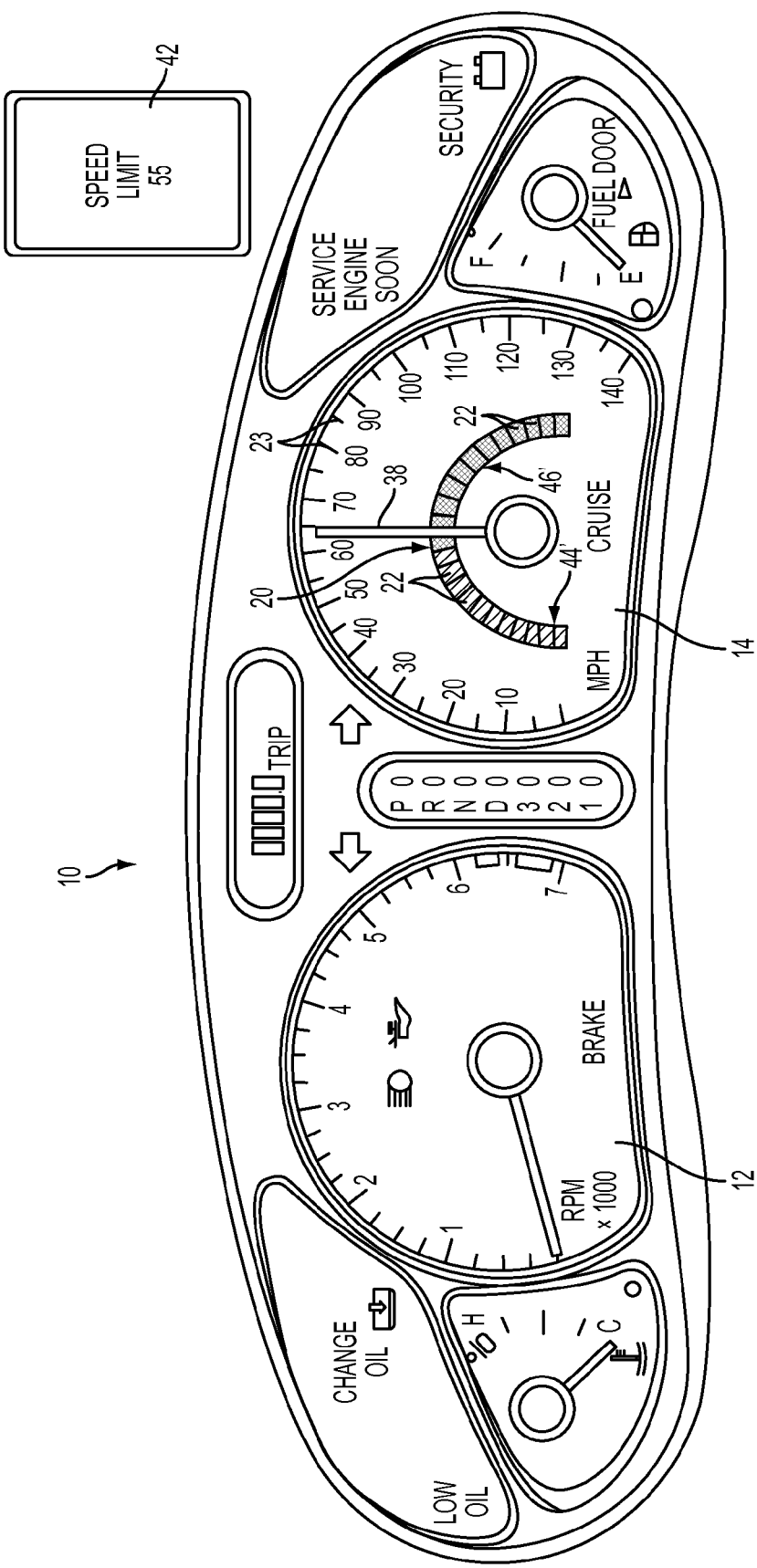
FIG. 2 is a view of the cluster of FIG. 1, with the speed warning indicator indicating that the vehicle operating above the posted speed limit.

With reference to FIG. 2, if the posted speed limit is 55 mph (as obtained by the control unit 26), the lights 22 of the warning indicator 20 that correlate with speeds below the posted speed limit of 55 mph are illuminated green, indicating a speed compliance zone 44' and the lights 22 of the warning indicator 20 that correlate with speeds above the posted speed limit of 55 mph are illuminated red, indicating a speed non-compliance zone 46'. Thus, the driver can easily see that the pointer 38, indicating a vehicle speed of about 65 mph, is in the red, speed non-compliance zone 46' of the warning indicator 20.

Figure 3:
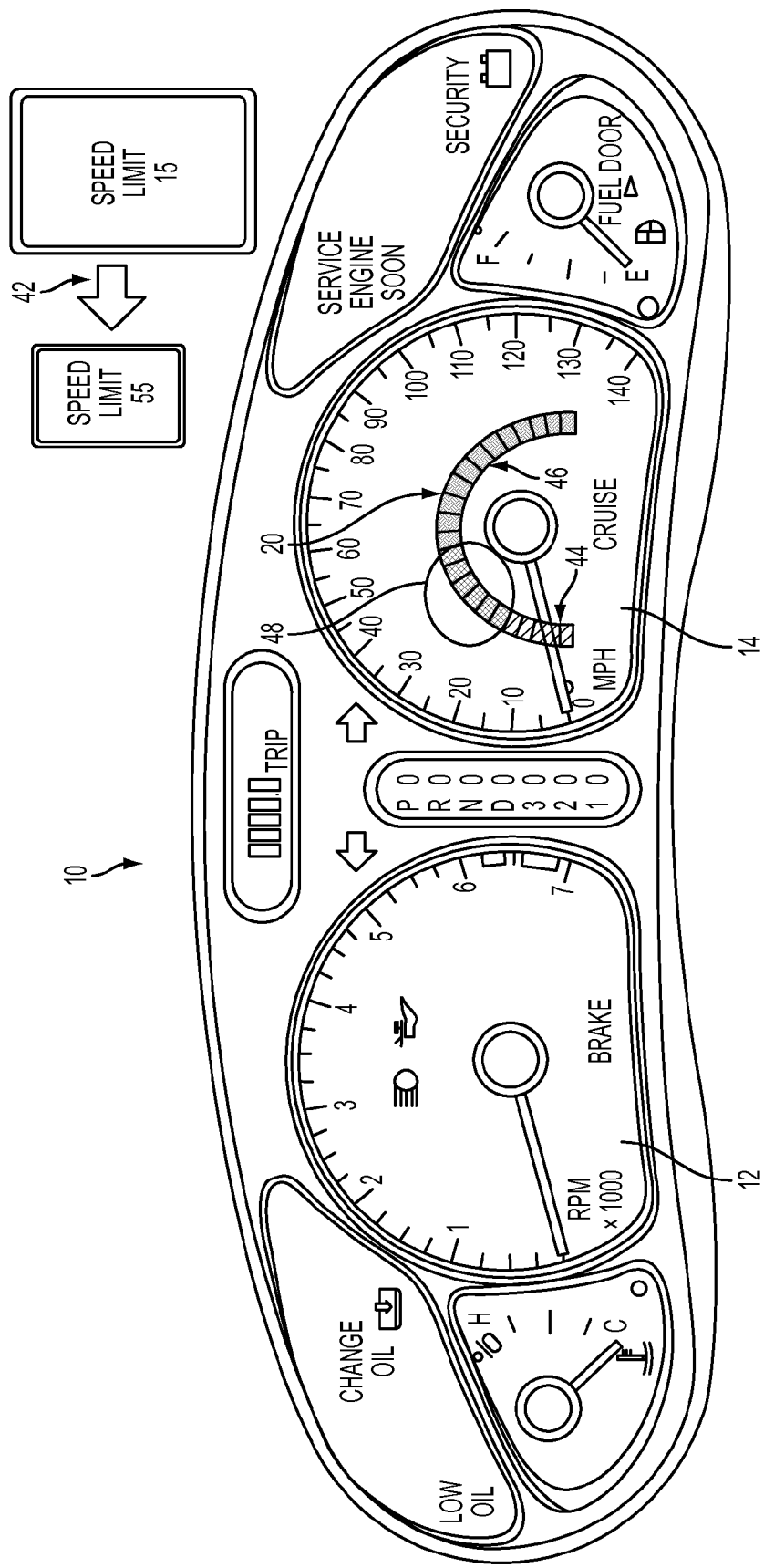
FIG. 3 is a view of the cluster of FIG. 1, with the speed warning indicator indicating that the vehicle is approaching a speed limit change on the road.

FIG. 3 shows the cluster 10 of FIG. 1 when the vehicle is approaching a portion of the road where the posted speed limit is about to change, so as to pre-warn the driver of a sudden speed limit change. In the illustrated embodiment, the posted speed limit will soon be changing from the current speed limit, 15 mph to an approaching, new posted speed limit, 55 mph, as determined by the control unit 26. As a result, the control unit 26 will send the position of the vehicle and speed information via CAN 34 to cluster 10 and the cluster 10 will control the lights 22, of the warning indicator 20 that correlate with speeds between the current posted speed limit (15 mph) and the approaching new posted speed limit (55 mph), to blink and/or change color such as from red to yellow indicating a speed transition zone 48. Thus, in the embodiment, the lights encircled in FIG. 3 that correlate with the speeds of 16-54 are caused to blink and/or illuminate yellow, indicating to the driver the speed transition zone 48. Such pre-warning is more important if the speed limit is reducing from the current posted speed limit to a much lower new posted speed limit, since law enforcement speed monitoring is commonly performed at such transitions in speed limits.

Due to the use of GPS data, the warning indicator 20 is helpful in aiding a driver to be in compliance with the posted speed limit even in the event that the driver might not know the speed limit due to missing speed limit signs. Since the warning indicator 20 provides information without the need for driver input, driver distractions are reduced. Since the warning indicator is inexpensive to manufacture and implement, it is not limited for use in luxury vehicles, but can be employed in lower cost vehicles.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. An instrument cluster system for a vehicle comprising:
   an instrument cluster comprising:
      a speedometer gauge including markings indicative of speeds of the vehicle, and a pointer movable relative to the markings,
      a speed warning indicator comprising a plurality of adjacent lights, separated from the markings, and arranged in position to correlate substantially with the markings,
   a control unit in communication with the instrument cluster and constructed and arranged to receive inputs including a speed of the vehicle, and
   a global positioning system ("GPS") circuit constructed and arranged to provide a location of the vehicle to the control unit so that the control unit can obtain a posted speed limit of a road on which the vehicle is located,
   wherein the control unit is constructed and arranged to send processed data to the cluster so that the cluster can control the lights of the speed warning indicator to illuminate in at least two different colors based on the provided posted speed limit, such that lights correlating with speeds below the posted speed limit can be illuminated in a first color and lights correlating with speeds above the posted speed limit can be illuminated in a second color, thereby providing a visual warning to a driver as to whether the vehicle is operating above or below the posted speed limit,
   wherein the control unit is further constructed and arranged to determine whether the provided posted speed limit will soon be changing to a new posted speed limit and to cause the lights of the warning indicator that correlate with speeds between the posted speed limit and the new posted speed limit to illuminate in a color that is different from the first and second colors.

2. The system of claim 1, wherein the lights correlating with speeds above the posted speed limit are constructed and arranged to illuminate once the vehicle is travelling above the posted speed limit.

3. The system of claim 1, wherein the speed warning indicator is disposed in the speedometer gauge and the pointer passes over a portion of the speed warning indicator.

4. The system of claim 3, wherein the cluster is constructed and arranged to illuminate the lights of the first color to be green and to illuminate the lights of the second color to be red.

5. The system of claim 3, wherein the speedometer gauge is in the form of a dial structure having the markings arranged generally in an arced fashion, and wherein the lights are arranged in an arc-shape.

6. The system of claim 1, wherein in the lights are light emitting diodes.

7. The system of claim 1, wherein the cluster includes a controller constructed and arranged to cause the lights of the warning indicator that correlate with speeds between the posted speed limit and the new posted speed limit to illuminate yellow.

8. The system of claim 7, wherein the controller of the cluster is further constructed and arranged to cause the lights of the warning indicator that correlate with speeds between the posted speed limit and the new posted speed limit to blink.

9. The system of claim 1, further comprising a Controller Area Network (CAN) bus constructed and arranged to provide communication between the control unit and the cluster.

10. A method of providing visual indication to a driver of a vehicle as to a speed of the vehicle relative to a posted speed limit of a road on which the vehicle is located, the method comprising the steps of:
based on a position of the vehicle, obtaining the posted speed limit of a road on which the vehicle is located,
providing an instrument cluster for the vehicle to include a speedometer gauge having markings indicative of speeds of the vehicle, a pointer movable relative to the markings, and a speed warning indicator comprising a plurality of adjacent lights, separated from the markings, and arranged in position to correlate substantially with the markings,
controlling the lights of the speed warning indicator to illuminate in at least two different colors based on the obtained posted speed limit, such that lights correlating with speeds below the obtained posted speed limit are illuminated in a first color and lights correlating with speeds above the obtained posted speed limit are illuminated in a second color, thereby providing a visual warning to a driver as to whether the vehicle is operating above or below the obtained posted speed limit,
determining that the posted speed limit will soon be changed to a new posted speed limit, and
controlling the lights of the speed warning indicator that correlate with speeds between the posted speed limit and the new posted speed limit to illuminate in a color that is different from the first and second colors.

11. The method of claim 10, wherein the step of controlling the lights includes illuminating the lights correlating with speeds above the posted speed limit once the vehicle is travelling above the posted speed limit.

12. The method of claim 10, wherein the step of obtaining the posted speed limit includes using a global positioning system.

13. The method of claim 10, wherein the speed warning indicator is disposed in the speedometer gauge and the pointer passes over a portion of the speed warning indicator.

14. The method of claim 10, wherein the step of controlling the lights includes illuminating the lights of the first color, green and illuminating the lights of the second color, red.

15. The method of claim 13, wherein the speedometer gauge is in the form of a dial structure having the speed markings arranged generally in an arced fashion, and wherein the lights are arranged in an arc-shape.

16. The method of claim 10, wherein the lights of the warning indicator that correlate with speeds between the posted speed limit and the new posted speed limit are controlled to illuminate yellow.

17. The method of claim 16, wherein the lights that correlate with speeds between the posted speed limit and the new posted speed limit are controlled to blink.

* * * * *